United States Patent Office 3,513,215
Patented May 19, 1970

3,513,215
OXIDATIVE DEHYDROGENATION OF
MONO-OLEFINS
Frank T. Ogle, Bartlesville, Okla., assignor to Phillips
Petroleum Company, a corporation of Delaware
No Drawing. Filed Apr. 21, 1967, Ser. No. 632,526
Int. Cl. C07c 5/18
U.S. Cl. 260—680  9 Claims

ABSTRACT OF THE DISCLOSURE

In the oxidative dehydrogenation of mono-olefins, such as butenes, in admixture with steam and oxygen in contact with an oxidative dehydrogenation catalyst containing an alkali metal carbonate, CO is added to the reaction mixture to be oxidized to $CO_2$ to supply additional heat input and to preserve the carbonate in the catalyst.

This invention relates to an improved process for the oxidative dehydrogenation of mono-olefins.

It is conventional in the petroleum industry to catalytically dehydrogenate n-butane over a catalyst such as chromium oxide deposited on an alumina base or carrier to produce an effluent comprising butenes and butadiene. The resulting effluent is then subjected to further dehydrogenation in contact with a butene dehydrogenation catalyst to convert the butenes to butadiene. In this second phase of the process, substantial amounts of hydrogen are present and liberated which tend to inhibit the butene dehydrogenation. It has been proposed to incorporate oxygen in the butene feed to the second dehydrogenation in order to burn or oxidize the hydrogen, thereby removing this material from the reaction zone, simultaneously adding heat to compensate for the heat consumed, in the endothermic dehydrogenation, and increasing conversion to butadiene.

A conventional catalyst for butene dehydrogenation comprises iron oxide, chromium oxide, and an alkali metal carbonate such as potassium carbonate. Operation with this catalyst in the presence of relatively large concentrations of steam promotes the water-gas reaction and maintains the catalyst substantially free of carbonaceous deposits as long as there is an effective amount of the carbonate present in the catalyst. However, after extended periods of operation, the potassium carbonate concentration is substantially reduced by loss of $CO_2$ from the compound due to decomposition under the conditions in the reactor. Such carbonate loss results in deterioration of the catalyst and necessitates regeneration thereof and incorporation of more potassium carbonate therein.

This invention is concerned with an improvement in the oxidative dehydrogenation of mono-olefins in contact with a dehydrogenation catalyst containing an alkali metal carbonate and in admixture with steam.

Accordingly, it is an object of the invention to provide an improvement in the process of dehydrogenating aliphatic olefins, both acrylic and alicyclic, which contains at least four non-quaternary contiguous carbon atoms, such as normal butene, isoamylenes, cyclopentene, and similar higher olefins having up to seven carbon atoms, to corresponding polyolefins including diolefins. Another object is to increase the life of a dehydrogenation catalyst containing an alkali metal carbonate used in a steam-containing ambient in the dehydrogenation of mono-olefins. Other objects of the invention will become apparent to one skilled in the art upon consideration of the accompanying disclosure.

A broad aspect of the invention comprises dehydrogenating a vaporized feed steam containing the selected olefin reactant to be dehydrogenated in admixture with a substantial concentration of steam, oxygen, and CO in contact with a dehydrogenation catalyst containing an alkali metal carbonate. The amount of oxygen introduced with the feed is at least sufficient to oxidize all of the hydrogen formed in the reaction and all of the CO introduced to the reaction zone. It is preferred to introduce oxygen in the range of about 0.5 to 2.0 mols per mol of olefin and CO in the range of about 0.1 to 1.0 mol per mol of olefin. The amount of steam incorporated in the feed is sufficient to give a steam to olefin mol ratio in the range of 1:1 to 12:1.

The invention is applicable to the dehydrogenation of normal butenes to butadiene and/or isoamylenes, particularly tertiary amylenes, to isoprene as well as cyclopentene to cyclopentadiene, normal amylene to piperylene and higher olefins, such as hexenes and heptenes, to the corresponding more-unsaturated products. The invention is particularly applicable to the dehydrogenation of butene-1 or butene-2, either cis or trans, or a mixture of n-butenes such, for example, as the crude or purified effluent from a butane dehydrogenation step or process.

Any oxidative dehydrogenation catalyst known in the art may be utilized in the dehydrogenation process. These catalysts include the oxides of tin and phosphorus, to which calcium may be added, wherein the calcium to tin ratio lies in the range of 0.1:1.0 to 5:1; the oxides of tin, boron, and phosphorus in which the boron content is about 1 to 5 weight percent of the composite; lead molybdate in admixture with aluminum tungstate and/or cobalt tungstate; stannic phosphate; the oxides of iron and chromium, the oxides of molybdenum and bismuth, etc. At least two and up to 60 weight percent of potassium carbonate based on the total weight of the catalyst is incorporated in each of the foregoing enumerated catalysts. The catalyst is generally used in pellet form in fixed bed operation but it may also be prepared in powdered form (about 100 mesh size) for a fluidized bed operation.

Generally, the method of contacting and reaction conditions are those conventional in the art, with the exception of the presence of added CO in a reaction zone.

To illustrate the invention, n-butene is dehydrogenated at a temperature in the range of about 1000–1075° F. and an inlet pressure of about 25 p.s.i.g. in contact with a fixed bed of chromium oxide-on-alumina catalyst at a feed rate of n-butane of about 300,000 standard cubic feet per hour. The effluent from the n-butane dehydrogenation is passed directly (without separation) into a fixed bed of oxidative dehydrogenation catalyst of iron oxide, chromium oxide and potassium carbonate at an inlet temperature of about 875° F. and a pressure of 15 p.s.i.g., in admixture with about 100,000 pounds of steam per hour at a temperature in the range of 700–800° F., about 600,000 standard cubic feet of air per hour, and about 50,000 standard cubic feet of CO per hour. The reaction produces a high concentration of butadiene in the hydrocarbon portion of the effluent from the second dehydrogenation step. The oxidation of CO in this step maintains a substantial concentration of $CO_2$ in the catalyst bed and prevents substantial deterioration of the potassium carbonate which substantially increases the life of the catalyst and maintains its high activity.

The feed inlet temperature to the butene dehydrogenation step will depend upon the particular catalyst used, some catalysts effecting efficient butene dehydrogenation at a temperature as low as about 875° F. and others requiring temperatures in the range of 1100 to 1200° F.

Process benefits derived from the incorporation of CO, air, and steam in the mono-olefin feed are enumerated below.

(1) Immediate release of the heat of oxidation furnishes an auxiliary supply of heat which permits operating with a lower reactor inlet temperature. Thus, low efficiency thermal reactions of butenes in the reactor inlet are eliminated and selectivity is increased.

(2) The auxiliary heat supply also permits operation at temperature levels higher than conventional. All reactions are in the catalyst bed. Feed rate or space velocity can be increased. Thus, the best combination of reaction time and temperature is effected and higher capacity at given selectivity is obtained.

(3) Burning both the hydrogen and the CO, selectively, increases the reaction rate of butenes to butadiene.

(4) The $CO_2$ oxidation product suppresses the decomposition of potassium carbonate of the catalyst, thereby maintaining the regenerative capacity of the catalyst thru the water-gas reaction in the presence of steam at a high level. This permits operation at lower than conventional temperatures with high selectivity.

(5) Faster reaction rates (butenes to butadiene) permits reduction in bed depth for given feed rate. In addition to catalyst saving, the lower bed depth permits a decrease in operating pressure, thereby increasing selectivity.

Certain modifications of the invention will become apparent to those skilled in the art and the illustrative details disclosed are not to be construed as imposing unnecessary limitations on the invention.

I claim:

1. In a process for the oxidative dehydrogenation of a mono-olefin aliphatic hydrocarbon of 4 to 7 non-quaternary contiguous carbon atoms per molecule to produce principally a hydrocarbon of the same number of carbon atoms but of at least one additional ethylenic bond, in contact with a dehydrogenation catalyst containing an alkali metal carbonate, in admixture with steam and free oxygen, the improvement comprising incorporating in the reaction mixture an amount of CO in the range of about 0.1 to 1.0 mol per mole of olefin effective in maintaining a substantial concentration of $CO_2$ in the reaction mixture by reaction with said oxygen to provide heat for said dehydrogenation and suppress loss of carbonate from said catalyst.

2. The process of claim 1 wherein said catalyst consists essentially of iron oxide, chromium oxide, and potassium carbonate.

3. The process of claim 2 wherein said hydrocarbon comprises principally n-butene.

4. The process of claim 1 wherein the amount of oxygen added is at least sufficient to oxidize all of the H and added CO.

5. The process of claim 1 wherein the oxygen is in the range of about 0.5 to 2.0 mols per mol of olefin.

6. The process of claim 5 wherein said catalyst consists essentially of iron oxide, chromium oxide, and potassium carbonate.

7. The process of claim 1 wherein said hydrocarbon comprises butenes, said oxygen is in the range of about 0.5 to 2.0 mols per mol of butenes, and said butenes are converted to butadiene.

8. The process of claim 7 wherein said catalyst consists essentially of iron oxide, chromium oxide, and potassium carbonate.

9. The process comprising dehydrogenating n-butane in contact with a chromium oxide-alumina catalyst to form principally n-butenes and a minor amount of butadiene and dehydrogenating the resulting effluent in accordance with claim 1.

References Cited

UNITED STATES PATENTS

| | | | |
|---|---|---|---|
| 2,428,624 | 10/1947 | Holder | 260—680 |
| 3,161,670 | 12/1964 | Adams et al. | 260—680 X |
| 3,308,181 | 3/1967 | Pitzer | 260—680 |
| 3,320,329 | 5/1967 | Nolan | 260—680 |

PAUL M. COUGHLAN, Primary Examiner